United States Patent Office 2,756,310
Patented July 24, 1956

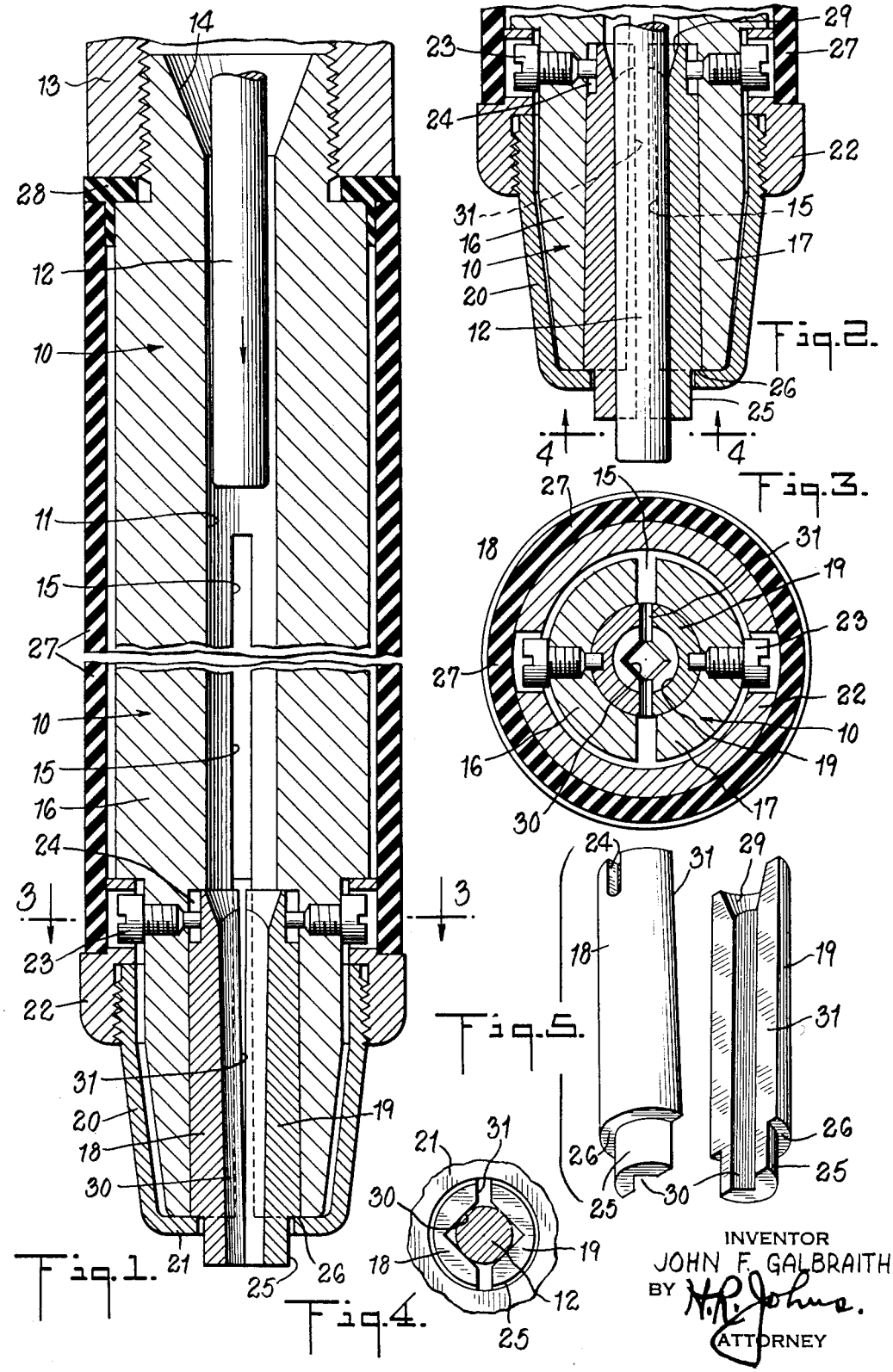

2,756,310

WELDING ROD HOLDER

John F. Galbraith, Plainfield, N. J., assignor to Union Carbide and Carbon Corporation, a corporation of New York Application April 6, 1953, Serial No. 347,029

16 Claims. (Cl. 219—8)

This invention relates to a welding nozzle or a holder for a welding rod and has for an object to provide such a device having a longer life than the solid type, with wear inserts that may be readily and cheaply replaced yet adapted for supplying to the welding rod as large or larger current densities as the said solid type nozzle is capable of doing. Another object is to provide such a nozzle that is less bulky than is the so-called U block type, enabling the rod holder to be used conveniently in corners and elsewhere not accessible to the U block type.

Today welding rod holders for use in submerged arc welding and in welding of other types in which the weld is shielded from the air, are commonly of two general sorts. In one of these the welding rod is fed through a solid type nozzle. Such a nozzle has the advantage of providing maximum accessibility to the work yet has the disadvantage of being of short life due to wear requiring the holder to be discarded after a comparatively few hours of work. The other type or so-called U block holder includes heavy blocks of conductive metal and these are capable of transmitting a maximum current to the welding rod but they are bulky and not adapted for use where the rod has to go into corners. There has long been a need for a welding nozzle which eliminates the disadvantages of each type while at the same time possessing their advantages. The present invention is believed to be the closest approach to that old need.

Specifically this nozzle is adapted for appropriate current densities by providing a pair of manganese bronze cantilever jaws resiliently clamping a welding rod between them. Compact beryllium copper inserts are located between the jaws and the rod and each insert is shaped to clamp the welding rod initially along two lines of contact which widen with wear. Also the inserts are preferably tapered slightly so that the clamping stress exerted by the jaws is more nearly uniform along the entire length of each insert.

Referring to the drawing, Fig. 1 is a longitudinal section through a preferred embodiment of this invention. Fig. 2 is a view corresponding to Fig. 1 but showing the welding rod being clamped in position. Fig. 3 is a section on the line 3—3 of Fig. 1. Fig. 4 is a section on the line 4—4 of Fig. 2. Fig. 5 is an exploded view of the inserts shown in the preceding figures of the drawing.

The tube 10 is of manganese bronze provided with a central bore 11 through which welding rod 12 is adapted to be fed. A tubular conductor 13 is threaded onto the tube 10 and the welding current for the rod 12 is supplied through the conductor 13. The rear end of the tube 10 is tapered at 14 around the bore to facilitate the entrance of the welding rod into the bore of the tube 10. To provide a pair of resilient cantilever arms 16 and 17, the tube 10 is slotted at 15. The depth of the slot 15 and the resulting length of the arms 16 and 17 depends on the degree of resilient clamping pressure desired. In practice the arms 16 and 17 are about 5⅜ inches long for an 8 inch tube having an outside diameter of 1⅛ inches with a 5⁄16 inch diameter of bore.

To provide wear resisting and conductive contacts through which the rod is fed, beryllium copper inserts 18 and 19 are provided of the general shape illustrated. In order to hold these inserts in place against the outward thrust imparted to them by the moving welding rod, these inserts are retained in place by the inwardly turned flange 21 of a collet nut 20. A nut retaining collar 22 is in threaded engagement with the nut and is held fixed with respect to the tube 10 by the screws 23. These screws have an additional function inasmuch as their inner ends engage grooves 24 in the rear portions of the inserts for the purpose of preventing angular displacement of one insert with respect to the other. Each insert has a reduced forward end portion 25 and a shoulder 26 against which the flange 21 contacts. A tube 27 of micarta or other appropriate insulating material surrounds the tube 10 and seats in ledges provided for it in the collar 22 and in a washer 28.

The rear end of the inserts is also tapered as shown at 29 to facilitate the entry of the welding rod between these inserts. Each insert is provided with a V groove 30. In the embodiment illustrated the V groove is provided with a 90° angle at the vertex. In this way the contact between each insert and the welding rod is initially along the line of tangency between the rod and the sides of the V groove and space is provided for residues such as scraped oxides, etc. to fall through. When wear occurs this line contact is widened. Due to the fact that clamping pressure exerted by the cantilever arms would be a maximum at the rear end of these inserts provided they were of uniform thickness, and since it is desirable that contact between the welding rod and the nozzle take place close to the weld and substantially uniformly, these inserts are slightly tapered along their adjacent faces as shown at 31 in Fig. 1. This taper of the inserts is gradual and longitudinal, it being only a fraction of a degree, or more precisely about 31 minutes to conform to the angular displacement of the sides of the slot in the tube 10 after insertion of the rod 12. Fig. 1 shows the approximate magnitude and direction of the taper given these inserts. With the welding rod in place the taper does not show in Fig. 2 since its purpose is to distribute contact longitudinally between the inserts and welding rod substantially uniformly.

A holder may be of a size to receive pairs of inserts for welding rods of different sizes. The 2% beryllium copper inserts are known to give good contact with good wear. These inserts are made from a rod which has been annealed, then cut to the shape indicated and afterward hardened to have a Rockwell hardness of C 32–36. The drawing shows the preferred embodiment substantially to scale. Also as shown in the preferred embodiment of the invention, the jaws 16 and 17 are each tapered near the work end of the holder but opposite to each other, the outer ends of the inserts 18 and 19 being thicker while the outer ends of the jaws 16 and 17 are thinner adjacent the work, the jaws being preferably tapered for a portion of the length of the inserts.

Among the advantages of this invention may be mentioned the fact that the welding rod holder of this invention has been found to possess a life about eighteen times longer than that of the solid type nozzle when transmitting between 450 and 700 amperes to the welding rod. The external shape and the conical forward end on this holder enable the holder of this invention to get into more confined spaces than is possible with the bulky U block type holder. The replaceable inserts have a life that has been found satisfactory until the wear in these inserts has become such as to remove substantially all of the flat faces of the V grooves and until the inserts become scored. The use of cantilever spring arms provides the necessary floating action that may be desired in event the welding rod has not been entirely straightened prior to its entry into the holder of this invention. In event the rod be slightly curved so that greater flexure occurs in one arm than the other, that arm in which the greater distortion takes place clamps the insert against the rod with greater than usual pressure to make up for what the other arm lacks in departure from its usual clamping pressure. The flexure in the cantilever arms is that due to the size of the welding rod inserted in the holder. When no welding rod is in place the arms 16 and 17 are substantially unstressed and the front ends of the inserts 18 and 19 are substantially in contact as shown in Fig. 1 before entry of the welding rod 12.

As shown in the drawing, the ratio of length to thickness of each cantilever jaw is at least about 5 to enhance the resilience of their clamping action.

I claim:

1. A welding rod holder comprising a body of conductive metal through which a welding rod is adapted to be fed, a support for said body, means whereby welding current may be supplied to said body, said body having at least one longitudinal slot through a portion of the length of said body whereby at least a pair of resilient cantilever arms are formed therein, a longitudinal outer end portion of each arm being longitudinally recessed adjacent the path of said rod, a wear resisting conductive insert in each arm recess, said inserts being tapered to have their maximum thickness adjacent the work and to distribute clamping pressure longitudinally along a welding rod and means for retaining said inserts against longitudinal movement with a rod and for retaining each insert against angular displacement from its supporting resilient arm, whereby no spring is required between each arm and its insert and the necessary resilience for the inserts is supplied by the resilient cantilever supporting arms.

2. A welding rod holder according to claim 1 in which the outer end of each arm is outwardly tapered and each insert is tapered oppositely to the arm taper, said arm taper being at a larger angle to the longitudinal axis of said holder than is the taper to said insert.

3. A holder for a welding rod comprising a plurality of resilient cantilever arms, a support therefor through which a welding rod is adapted to be moved, at least one replaceable insert at the yieldable end of each of said arms, each insert having pair of surfaces meeting in an angle of a size to have each of said surfaces substantially tangent to the surface of a welding rod, the resilience of said arms clamping said insert against a welding rod passing through said holder, said arms being formed by slotting in a tubular conductor, the outer ends of said arms being shaped to receive said inserts and press them against said welding rod being moved between them, each insert being of beryllium copper having at least about a 90° V angle slot on its inner face, whereby welding current is transferred from said tubular conductor through said inserts and from each insert to a welding rod along at least two line contacts when said inserts are new, the lines of contact being widened with wear.

4. A welding rod holder according to claim 3 in which each insert is tapered a fraction of a degree to provide substantially uniform pressure longitudinally of the insert.

5. A welding rod holder according to claim 4 in which said taper is about 31 minutes.

6. A welding rod holder according to claim 3 in which said inserts are of one size for a given size of welding rod and of another size for a different size of welding rod, each size being such that the rod engaging surfaces of the inserts may wear substantially arcuate in cross section before flexural stress is relieved from said cantilever arms.

7. A welding nozzle comprising cantilever spring jaws between which a welding rod may be moved, replaceable wear resisting conductive inserts between the jaws for transmitting welding current to and guiding a welding rod adjacent the weld, and abutment means for both holding said inserts within the nozzle against longitudinal outward thrust on them due to movement of such a rod under jaw clamping pressure and also for permitting limited transverse outward flexure of either or both jaws and inserts due to a bend or change in size of a welding rod until said abutment means is engaged for stopping further outward flexure.

8. A welding rod holder comprising a tubular body of conductive metal through which a welding rod may be moved and supplied with current therefrom, one end portion being adapted for connection to a source of welding current, the opposite end of said tubular body being slotted to provide resilient cantilever arms, wear resisting conductive inserts in the outer end of each cantilever arm, the length of the cantilever arms and thickness of the inserts being sufficient to spread said arms for exerting a clamping action on a welding rod, a conical collet nut having a flange bent over an end portion of said inserts for retaining them against outward thrust exerted by the welding rod movement and a locking means cooperating with said tubular body and collet nut to retain the latter against being moved longitudinally off said tubular body.

9. A welding rod holder according to claim 8 in which a retaining collar is threaded to said collet nut and said locking means includes a screw passing through said collar and into said tubular body.

10. A welding holder according to claim 9 in which an insulating sleeve encloses said tubular body and extends over said screw, said collar being shouldered to provide an abutment for one end of the insulating sleeve.

11. A welding holder according to claim 10 in which the end of said tubular body adapted for connection to a source of welding current is threaded to receive a conductor constituting an abutment for a rear end of said sleeve.

12. A welding rod holder comprising resilient cantilever arms between which a welding rod is adapted to be fed as it receives welding current supplied through said arms, and wear resisting electrically conductive inserts between the arms and such a rod, each insert having a longitudinal taper to flex an outer end portion of an arm to a greater amount due to said taper and the engagement of a rod for the full length of the insert than the insert would impart to an outer end of an arm were the insert of uniform depth radially of the rod, whereby the pressure contact of each arm upon a rod may be made more nearly substanitally uniform along said insert.

13. A welding rod holder comprising a tube having a longitudinal slot extending through a major portion of the length of said tube and forming a pair of yieldable cantilever jaws for resiliently clamping a welding rod between them, said jaws being shaped to transfer welding current from said tube to a welding rod through an outer end portion of said jaws, the jaws being recessed at their outer end portions, wear-resisting inserts in such portions, and the ratio of the total length to thickness of said jaws back of said recessed portions being about 5 to enhance the resilient clamping action of said jaws.

14. A welding rod nozzle comprising a conductive tube through which a welding rod is adapted to be fed, said tube having therein a longitudinal slot forming cantilever spring jaws for applying pressure to a welding rod, and wear-resisting conductive inserts between said jaws and the welding rod, said inserts being tapered with their thicker ends adjacent to the work whereby the rod is held securely near the work and the pressure of said jaws and inserts against the rod is distributed longitudinally.

15. A welding rod nozzle according to claim 14 in which the wear-resisting inserts and the jaws are each tapered near the work but opposite to each other, the outer ends of the inserts adjacent the work being thicker but the jaws being thinner adjacent the work.

16. A welding rod nozzle according to claim 15 in which said jaws are tapered for a portion of the length of the inserts, but not for the entire length of the inserts.

References Cited in the file of this patent

UNITED STATES PATENTS

| | | |
|---|---|---|
| 1,644,237 | Christensen | Oct. 4, 1927 |
| 2,014,226 | Catlett | Sept. 10, 1935 |
| 2,379,470 | Baird | July 3, 1945 |
| 2,490,024 | Bernard | Dec. 6, 1949 |